Jan. 15, 1935. J. W. HARRISON ET AL 1,987,934
HEAT EXCHANGE APPARATUS
Filed Nov. 21, 1932   2 Sheets-Sheet 2
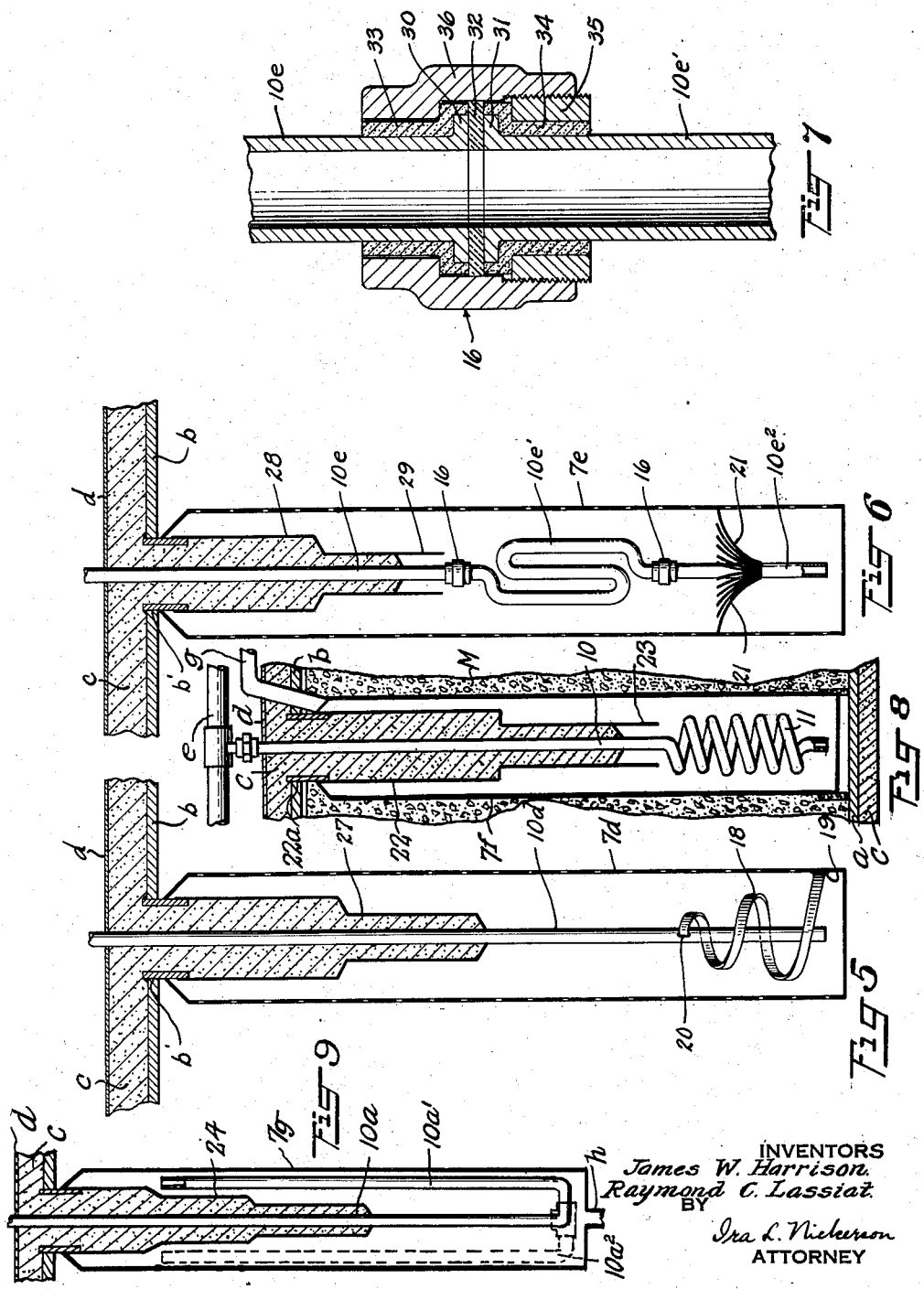

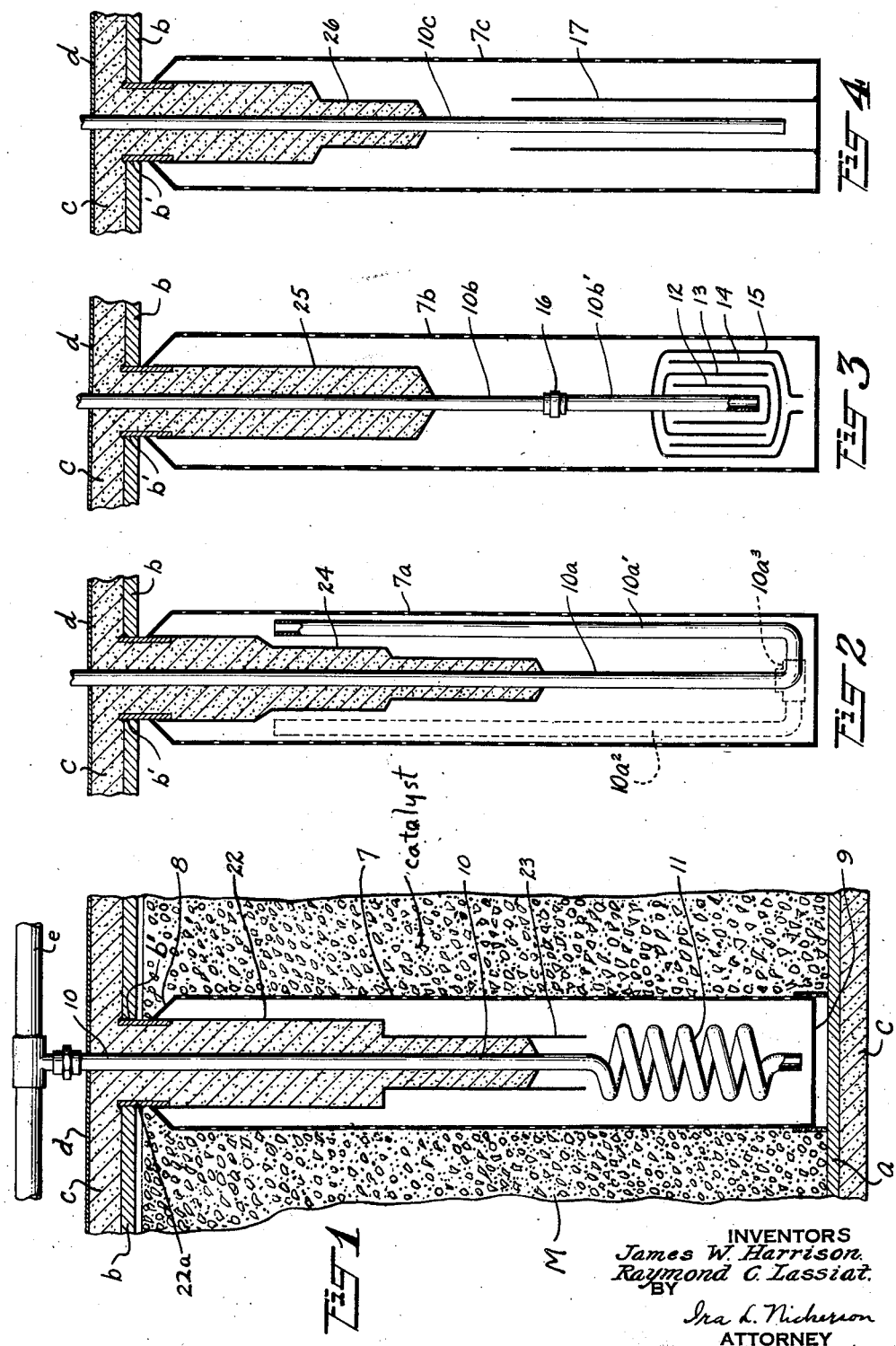

Patented Jan. 15, 1935

1,987,934

UNITED STATES PATENT OFFICE 1,987,934

HEAT EXCHANGE APPARATUS

James W. Harrison, Woodbury, N. J., and Raymond C. Lassiat, Paris, France, assignors to Houdry Process Corporation, Dover, Del., a corporation of Delaware Application November 21, 1932, Serial No. 643,654

24 Claims. (Cl. 23—288)

This invention relates to heat exchange and to the use of the same for the control of temperatures of contact masses, especially when the apparatus is applied to the distribution of fluids within such a mass and/or the removal of fluids from the mass. It is equally useful whether the contact material be inert to the fluids brought into contact therewith or capable of chemically reacting therewith or of promoting chemical transformations, either exothermic or endothermic. More specifically it concerns nested tube units of the type disclosed and claimed in the copending application of Thomas B. Prickett and Eugene J. Houdry, Serial No. 612,222, filed May 19, 1932, and of the copending application of James W. Harrison, Serial No. 630,262, filed August 24, 1932.

One object of the invention is to provide improved ways and means for controlling the heat transfer between a contact mass and a fluid entering or leaving the mass. Another object is to vary the heat transfer to or from predetermined portions of the mass. Still another object is to increase or decrease the exchange of heat between localized portions of a mass and fluid in motion but out of direct contact with the mass. Other objects will be apparent from the detailed description which follows.

In one practical application of the invention, nested tube units according to the aforementioned copending applications are embedded in the contact mass. The latter may be of any suitable material for effecting any known or desired treatment or modification of the starting substances, especially when the treatment or reaction involves heat exchange and the regulation of the temperature of the mass within a relatively narrow range.

The invention provides for an increase in the transfer of heat from those portions of the mass which tend to reach too high a temperature during an exothermic reaction and to those portions which tend to receive too little heat during an endothermic reaction. The invention also contemplates checking or decreasing the heat transfer at other points, thereby to effect uniform temperature control of the entire mass.

In order to illustrate the invention, concrete embodiments thereof are shown in the accompanying drawings, in which:

Fig. 1 is a sectional view of a fluid conducting unit embedded in a contact mass, portions of the container for the contact mass, and of certain associated parts being also shown in section;

Figs. 2, 3, 4, 5 and 6 show modified forms of the fluid conducting unit;

Fig. 7 is a detail sectional view on an enlarged scale of one form of heat insulating coupling for sections of the inner conduit; and Figs. 8 and 9 are sectional views similar to Figs. 1 and 2, respectively, showing minor modifications of the units illustrated therein.

Fig. 1 shows a fragmentary portion of a casing containing a contact mass M within which is embedded one of the fluid conducting units of the present invention. The contact mass M may be of any known material for producing the desired effect upon the substance or substances brought into contact therewith. Accordingly, it may be merely inert material, such as gravel or stones for breaking up or retarding the flow of the fluid, or it may possess catalytic activity. The fluid conducting unit embedded in the mass may serve to cool or to heat the mass, in which case the heat exchange fluid may or may not be brought into direct contact with the mass. Or the unit may serve to distribute throughout the mass, at a uniformly controlled temperature, one or more substances, some or all of which may take part in the reaction, or the unit may withdraw the products of the reaction. The unit may also be used to distribute a fluid for cleaning or purifying the contact mass or for regenerating or reactivating the mass if it possesses catalytic activity. The reaction which takes place in mass M may be either exothermic or endothermic, and the purpose of the fluid conducting unit, whether used for distribution or withdrawal of the fluid or for heat control only when there is no direct contact between mass and fluid, is designed to impart heat to or withdraw heat from the mass throughout the depth of the same so that the mass may be maintained at uniform temperature throughout, or at any desired gradation of temperature, or be raised or lowered in temperature in a substantially uniform manner. Any desired or required number of the units or any combination may be used.

As shown in Fig. 1, mass M is supported between bottom and top headers $a$ and $b$, respectively, of a casing or container. The top header $b$ has an opening $b'$ in which a portion of the conducting unit may be secured, as will be presently described. The casing is suitably protected against loss of heat by a layer of insulating material $c$ on the exterior surface thereof, and an outer cover such as $d$ may be provided to protect the insulating material.

The fluid conducting unit comprises an outer tubular member 7 having closed upper and lower ends 8 and 9, respectively, which may or may not be out of contact with mass M. The side walls which engage mass M are perforated as indicated, in order to discharge fluid into the mass or to receive fluid products from the mass. Fluid is admitted to or discharged from the unit by inner tube or conduit 10 which extends beyond the casing and connects with a pipe or manifold e. Inner conduit 10 is of uniform size throughout its length and hence, in order to produce an increased heat exchange at any portion of its length, suitable means must be provided either by way of an increased surface for heat transfer or by a direct conducting path between the inner and outer conduits. In the form of the invention shown in Fig. 1, an increased area for heat transfer is provided by making inner conduit 10 of greater linear dimension by means of a coil 11 than is permitted in a straight conduit. In the modification shown in Fig. 2, an inner conduit 10a of increased length is also used, but the conduit is formed with a return bend at the bottom of outer conduit 7a, forming a section 7a in parallelism with the first portion and discharging or receiving fluid above the bottom of the unit, as at or near the upper portion of the unit. One or more additional sections may be conveniently provided if desired, as indicated by broken lines at $10a^2$ by the use of a union indicated at $10a^3$ near the bottom of the unit.

In the form of the invention shown in Fig. 3, increased heat exchange in a localized portion is provided by a series of nested and opposed baffles 12, 13, 14 and 15 enclosing the lower or open end of the inner conduit, so that fluid moves in reverse directions through a greatly extended path while subject to transfer of heat by convection from the baffles heated by radiation from outer conduit 7b, which heat is imparted to the latter by the mass in direct contact with the same. In order to reduce the heat losses to manifold e and to atmosphere by the conducting path provided by inner conduit 10b, the latter may be formed in two sections connected by a heat insulating coupling of any suitable or desired type indicated at 16, the outer or lower section 10b' carrying the reversed baffling units 12 to 15, inclusive.

In Fig. 4, only one baffle is provided which, in this instance, takes the form of an open conduit 17 enclosing the lower or open end of inner conduit 10c. It is welded or otherwise secured to the bottom of outer conduit 7c, although it may have a closed lower end and be suspended from inner conduit 10c if desired. Baffle 17 reverses the direction of the incoming or outgoing fluid and extends the path of the fluid before its admission to or after its departure from outer conduit 7c so as to effect heat exchange by both radiation and convection. Baffle 17 may be of any length but its open end is advantageously located adjacent that part of the contact mass which tends to be coldest or hottest.

Figs. 5 and 6 show means for securing an increased transfer of heat by conduction. In Fig. 5, a flexible metal strip 18 is secured at 19 adjacent the lower end of the outer conduit 7d and at 20 to an upwardly spaced point on inner conduit 10d, so that there may be a direct flow of heat from any portion of the outer conduit and the surrounding contact mass to any selected portion of the inner conduit 10d, the flexible strip 18 permitting any relative movement of conduits 10d and 7d which results from expansion of these parts under changes of temperature. If desired, inner conduit 10d may be formed in sections with a heat insulating coupling therebetween, after the manner indicated in Fig. 3.

Fig. 6 provides for zones of increased heat transfer from the outer conduit 7e to inner conduit 10e. In this case, inner conduit 10e is formed in sections insulated from one another by couplings 16. The first section 10e' beyond inner conduit 10e has two reverse bend portions to provide increased area for heat transfer by radiation and a lengthened path for heat transfer by convection. If desired, this section could be formed in a coil after that indicated at 11 in Fig. 1. The second insulated section $10e^2$ receives heat by conduction directly from outer conduit 7e by the provision of a plurality of flexible metallic elements 21 secured to the inner conduit section and flaring outwardly frictionally to engage or be fused or otherwise joined to outer conduit 7e. By reason of their flexibility, these elements serve to guide and centrally position the inner conduit within the outer conduit while permitting relative expansion and contraction of the same.

In order to complete selective control and regulation of temperature, the invention contemplates a decrease where necessary in the transfer of heat to certain portions of the inner conduit in addition to increases in transfer at other portions by the arrangements just described. The decreasing means may conform to those disclosed in the aforesaid copending applications Serial Nos. 612,222 and 630,262. For example, in Fig. 1, inner conduit 10 may be enclosed throughout a portion of its length by a stepped sleeve 22 secured to inner conduit 10 intermediate its ends and to the upper end of outer conduit 7, so as to close the latter. Sleeve 22 is secured to or forms a part of a collar 22a which extends through the opening in casing header b and is welded or otherwise secured to the latter to support the unit in place. The insulating material c between the header b and outer cover d may be extended within sleeve 22 more effectively to reduce the flow of heat between conduits 7 and 10. Sleeve 22 may also have a baffling extension 23 projecting beyond its point of attachment to inner conduit 10 and terminating somewhat above coil 11. In Fig. 2, a somewhat longer insulating sleeve 24 may be provided having two reduced steps. Fig. 3 shows another arrangement in which the insulating sleeve 25 is not stepped and is shorter than those shown in Figs. 1 and 2. Figs. 4 and 5 have single stepped insulating sleeves 26 and 27, respectively, similar to that shown in Fig. 1, but without the baffle extension. Fig. 6 provides a single stepped insulating sleeve 28 with a baffle extension 29.

Fig. 7 is an enlarged detail view of one type of insulating coupling 16 suitable for use in joining the sections of the inner conduit, as, for example, sections 10e and 10e' of Fig. 6. Each section of the inner conduit terminates in a flanged end 30 and 31, respectively, which are disposed in spaced alignment with a washer 32 of asbestos or other molded heat insulating material therebetween. The flanged ends of both pipes are enclosed also by stepped and molded heat insulating elements or bushings 33 and 34, the outer diameter of which conforms to that of washer 32. A threaded annulus 35 is sleeved over the reduced portion of one of the insulating bushings, as, for example, 34, while a coupling member 36 engages the reduced portion of the other bushing 33 and has a counterbored extension which sleeves over the joint between the conduit sections for threaded engagement with annulus 35.

If temperature regulation of the mass is to be effected without giving the heating or cooling fluid access to the mass, the outer conduits will be imperforate and will have outlets as desired. In units of the type shown in Figs. 1, 3, 5 and 6, the outlet for the imperforate outer conduit should be at the top of the latter, while for units of the type shown in Figs. 2 and 4, the outlet would more advantageously be located at the bottom of the imperforate outer conduit. Fig. 8 discloses the unit of Fig. 1 with its outer conduit 7f imperforate and with an outlet connection g at the top of the latter. Fig. 9 shows the unit of Fig. 2 with its outer conduit 7g imperforate and with an outlet connection h from the bottom of the same.

From the above, it will be apparent that the invention provides for positive and selective control of heat transfer to or from a fluid moving through or into or out of a contact mass, that apparatus units for effecting such results incorporate means for increasing and for decreasing to any desired degree or extent the exchange of heat between localized portions of the inner and outer conduits of the units, and that by distributing and embedding a suitable number of such units in a contact mass all portions of the mass will be at substantially the same temperature or at any desired gradation of temperature. Thus the mass can be uniformly brought to and held at its optimum temperature during its reactive and/or regenerative periods. Such accurate temperature control insures a maximum conversion or transformation of the starting material and a uniform product.

We claim as our invention:

1. The combination with a contact mass for effecting chemical transformations of a fluid conducting unit embedded in said mass and comprising a perforated outer conduit having closed ends and an inner conduit entering through one of the closed ends of said outer conduit and extending therewithin at least to a point adjacent the other closed end, and means for effecting an increased heat exchange by radiation between said mass and localized portions of said inner conduit.

2. The combination with a contact mass for effecting chemical transformations of a fluid conducting unit embedded in said mass and comprising a perforated outer conduit having closed ends and an inner conduit entering through one of the closed ends of said outer conduit and extending therewithin at least to a point adjacent the other closed end, and means providing zones of increased heat exchange by radiation between said conduits.

3. The combination with a contact mass for effecting chemical transformations of a fluid conducting unit embedded in said mass and comprising a perforated outer conduit having closed ends and an inner conduit entering through one of the closed ends of said outer conduit and extending therewithin, and means providing zones of increased and of decreased heat exchange by radiation between said conduits.

4. The combination with a contact mass for effecting chemical transformations of a fluid conducting unit embedded in said mass and comprising a perforated outer conduit having closed ends and an inner conduit entering through one of the closed ends of said outer conduit and extending therewithin, means providing zones of increased and of decreased heat transfer between said conduits, and means interrupting the heat conductive path between said zones provided by said inner conduit.

5. The combination with a contact mass for effecting chemical transformations of a fluid conducting unit embedded in said mass and comprising a perforated outer conduit having closed ends and an inner conduit entering through one of the closed ends of said outer conduit and extending therewithin, heat baffling means in the space between said conduits to provide a zone of decreased heat exchange, and means beyond said zone for effecting an increased heat exchange between localized portions of said conduits.

6. The combination with a contact mass for effecting chemical transformations of a fluid conducting unit embedded in said mass and comprising a perforated outer conduit having closed ends and an inner conduit entering through one of the closed ends of said outer conduit and extending therewithin, heat baffling means in the space between said conduits to provide a zone of decreased heat exchange, and means in spaced relation to said zone providing a heat conducting path between said conduits.

7. The combination with a contact mass for effecting chemical transformations of a fluid conducting unit embedded in said mass and comprising a perforated outer conduit having closed ends and an inner conduit entering through one of the closed ends of said outer conduit and extending therewithin, heat baffling means in the space between said conduits to provide a zone of decreased heat exchange, and flexible metallic means interconnecting said conduits outside said zone to form heat conducting paths while permitting relative expansive movement of said conduits.

8. The combination with a contact mass for effecting chemical transformations of a fluid conducting unit embedded in said mass and comprising a perforated outer conduit having closed ends and an inner conduit entering through one of the closed ends of said outer conduit and extending therewithin, heat baffling means in the space between said conduits to provide a zone of decreased heat exchange, a connection between said conduits outside said zone forming a heat conducting path, and means for interrupting the heat flow along said inner conduit between said connection and said zone.

9. A heat exchange unit adapted to be embedded in a contact mass comprising an outer conduit, a second conduit secured thereto and extending within said outer conduit for admitting fluid thereto, and means associated with said inner conduit for conducting the fluid in an extended path before admitting it into said outer conduit thereby to effect an increase in the transfer of heat by radiation between said inner conduit and said outer conduit.

10. In heat exchange apparatus, conduits in nested relation, the inner conduit for admitting fluid to or discharging fluid from the outer, heat insulating means between portions only of said conduits for restricting the transfer of heat therebetween; and baffle means in the space between said conduits but apart from said portions of said conduits, thereby to provide zones of decreased and increased heat transfer to or from the outer conduit.

11. A heat exchange unit adapted to be embedded in a contact mass comprising conduits in nested relation, the inner conduit for admitting fluid to or discharging fluid from the outer, said inner conduit being of greater length than the outer and having bends providing an extended path for the fluid while subjected to heat transfer to or from said outer conduit.

12. A heat exchange unit comprising inner and outer conduits in nested relation, said inner conduit being made up of sections, and heat insulating means connecting said sections and interrupting the heat conducting paths therebetween.

13. A heat exchange unit comprising inner and outer conduits in nested relation, said inner conduit being in sections, heat insulating couplings connecting said sections to break the heat conducting paths therebetween, and means for varying the heat transfer between said outer conduit and the sections of said inner conduit.

14. A heat exchange unit comprising inner and outer conduits in nested relation, said inner conduit for admitting fluid to or discharging fluid from said outer conduit and being of substantially uniform size, and means for increasing and for decreasing the normal heat transfer by radiation between said outer conduit and different portions of said inner conduit.

15. A heat exchange unit comprising inner and outer conduits in nested relation, said inner conduit for admitting fluid to or discharging fluid from said outer conduit and being of substantially uniform size, means establishing successive zones of decreased and increased heat transfer by radiation between said conduits, and means interrupting the flow of heat by conduction along said inner conduit between said zones.

16. A heat exchange unit comprising inner and outer conduits in nested relation, said inner conduit for admitting fluid to or discharging fluid from said outer conduit and being of substantially uniform size, heat insulating means dividing said inner conduit into distinct sections, and means establishing a direct conductive path between one of said sections and a portion of said outer conduit.

17. A heat exchange unit comprising inner and outer conduits in nested relation, said inner conduit for admitting fluid to or discharging fluid from said outer conduit and being of substantially uniform size, heat insulating means dividing said inner conduit into distinct sections, heat baffling means for decreasing the heat transfer to a section of said inner conduit, and means for increasing the heat transfer by radiation to the other section of said inner conduit.

18. A heat exchange unit comprising inner and outer conduits in nested relation, said inner conduit admitting fluid to or discharging fluid from said outer conduit, heat baffling means enclosing a portion of said inner conduit to form a zone of decreased heat transfer, and means beyond said zone for successively increasing the heat transfer between said conduits by radiation and by conduction.

19. A heat exchange unit comprising inner and outer conduits in nested relation, said inner conduit admitting fluid to or discharging fluid from said outer conduit, heat baffling means enclosing a portion of said inner conduit to form a zone of decreased heat transfer, said inner conduit being in sections beyond said zone, heat insulating couplings joining said sections to each other and to said inner conduit, means utilizing one section to form a zone of increased heat transfer by radiation, and means utilizing another section to form a zone of increased heat transfer by conduction.

20. A heat exchange unit adapted to be embedded in a contact mass comprising inner and outer conduits in nested arrangement, the inner conduit for admitting fluid to or discharging fluid from the outer member, and means providing successive zones of heat transfer in excess of the normal transfer by radiation between two nested conduits of the same sizes, one of said zones comprising an extension of the path for the fluid before it is admitted into said outer conduit.

21. A heat exchange unit adapted to be embedded in a contact mass comprising inner and outer conduits in nested arrangement, the inner conduit for admitting fluid to or discharging fluid from the outer member, means utilizing radiation and radiation and conduction in successive portions of said inner conduit to provide successive zones of heat transfer between said conduits in excess of the normal transfer by radiation between two nested conduits of the same sizes, and an insulated connection between said successive portions of said inner conduit.

22. In heat exchange apparatus for a contact mass, a unit adapted to be embedded in the mass comprising an outer conduit having openings therethrough, a second conduit extending within said outer conduit for admitting fluid thereto, means for restricting heat transfer by radiation between said conduits at one end, and means associated with said inner conduit for conducting the fluid in an extended path before admitting it into said outer conduit thereby to increase the transfer of heat between the latter and the fluid.

23. A heat exchange unit adapted to be embedded in a contact mass comprising conduits in nested arrangement, the inner conduit for admitting fluid to or discharging fluid from the outer, said inner conduit being of greater length than said outer conduit, and means interposed between said outer conduit and a portion of said inner conduit to restrict heat exchange by radiation therebetween.

24. A heat exchange unit adapted to be embedded in a contact mass comprising conduits in nested arrangement, the inner conduit for admitting fluid to or discharging fluid from the outer, heat baffling means enclosing a portion of said inner conduit to form a zone of decreased heat transfer, means beyond said zone for effecting increased heat transfer between said conduits by radiation, and means still further beyond said zone for effecting heat transfer between said conduits by conduction.

JAMES W. HARRISON.
RAYMOND C. LASSIAT.